US008570368B2

(12) United States Patent
Yahagi

(10) Patent No.: US 8,570,368 B2
(45) Date of Patent: Oct. 29, 2013

(54) WIRELESS AUDIO TRANSMISSION SYSTEM, RECEIVER, VIDEO CAMERA AND AUDIO MIXER

(75) Inventor: Yoshiyuki Yahagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1445 days.

(21) Appl. No.: 11/493,067

(22) Filed: Jul. 26, 2006

(65) Prior Publication Data

US 2007/0070208 A1    Mar. 29, 2007

(30) Foreign Application Priority Data

Jul. 27, 2005   (JP) ................................ P2005-217821

(51) Int. Cl.
*H04N 7/18*     (2006.01)
(52) U.S. Cl.
USPC ............................................. 348/61; 381/79
(58) Field of Classification Search
USPC .................. 381/79, 119; 455/130, 313, 63.1; 348/61; 193/79, 119
See application file for complete search history.

(56) References Cited

U.S. PATENT DOCUMENTS

| | | | | |
|---|---|---|---|---|
| 5,526,530 A | * | 6/1996 | Sueoka et al. | 455/212 |
| 5,901,357 A | | 5/1999 | D'Avello et al. | |
| 6,032,045 A | * | 2/2000 | Mimura | 455/446 |
| 6,711,381 B1 | * | 3/2004 | Cook et al. | 455/63.1 |
| 7,307,651 B2 | * | 12/2007 | Chew | 348/14.09 |
| 7,511,743 B2 | * | 3/2009 | Lim | 348/231.4 |
| 7,728,874 B2 | * | 6/2010 | Sekiguchi et al. | 348/207.99 |
| 2003/0157916 A1 | * | 8/2003 | Kamimura | 455/313 |
| 2005/0062843 A1 | | 3/2005 | Bowers et al. | |
| 2006/0229114 A2 | * | 10/2006 | Kim | 455/575.1 |

FOREIGN PATENT DOCUMENTS

DE           101 37 404           1/2002

(Continued)

OTHER PUBLICATIONS

"Wireless Microphones"; Dec. 3, 2010; The Federal Communications Commission; available at http://www.fcc.gov/encyclopedia/wireless-microphones.*

(Continued)

*Primary Examiner* — Mehrdad Dastouri
*Assistant Examiner* — Jeremaiah C Hallenbeck-Huber
(74) *Attorney, Agent, or Firm* — Frommer Lawrence & Haug LLP; William S. Frommer; Paul A. Levy

(57) ABSTRACT

A wireless audio transmission system includes: a transmitter having a microphone and a modulator-transmitter transmitting a radio wave modulated by an audio signal from the microphone; a receiver having a receiver-demodulator demodulating the audio signal after receiving the radio wave transmitted from the transmitter, outputting the audio signal demodulated by the receiver-demodulator to the outside of the receiver; and a video camera into which the audio signal output from the receiver is input, wherein the receiver has a detector detecting frequencies of a radio wave not being used by other devices based on a reception level of the radio wave received by the receiver-demodulator and outputs available frequency information indicating the frequencies detected by the detector to the video camera, and the video camera has a controller causing the available frequency information input from the receiver to be displayed on a display unit attached to the video camera.

9 Claims, 10 Drawing Sheets

(56) References Cited

FOREIGN PATENT DOCUMENTS

| | | |
|---|---|---|
| EP | 1 406 224 | 4/2004 |
| EP | 1 655 990 | 5/2006 |
| JP | 5 183788 | 7/1993 |
| JP | 6 77855 | 3/1994 |
| JP | 8-18479 | 1/1996 |
| JP | 11-17994 | 1/1999 |
| JP | 2003 102074 | 4/2003 |
| WO | WO 2005 006807 | 1/2005 |

OTHER PUBLICATIONS

"Distribution, Sale and Use of Wireless Microhpones Operating in the 700MHz Band Prohibited"; The Federal Communications Commission; available at http://www.fcc.gov/encyclopedia/wireless-microphones.*

"Distribution, Sale and Use of Wireless Microphones Operating in the 700MHz Band Prohibited"; The Federal Communications Commission; Oct. 15, 2011; available at http://www.fcc.gov/encyclopedia/wireless-microphones.*

* cited by examiner

| Channel | Frequency | Channel | Frequency | Channel | Frequency |
|---|---|---|---|---|---|
| 68-01 | 794.125 | 68-21 | 796.625 | 68-41 | 799.125 |
| 68-02 | 794.250 | 68-22 | 796.750 | 68-42 | 799.250 |
| 68-03 | 794.375 | 68-23 | 796.875 | 68-43 | 799.375 |
| 68-04 | 794.500 | 68-24 | 797.000 | 68-44 | 799.500 |
| 68-05 | 794.625 | 68-25 | 797.125 | 68-45 | 799.625 |
| 68-06 | 794.750 | 68-26 | 797.250 | 68-46 | 799.750 |
| 68-07 | 794.875 | 68-27 | 797.375 | 68-47 | 799.875 |
| 68-08 | 795.000 | 68-28 | 797.500 | | |
| 68-09 | 795.125 | 68-29 | 797.625 | | |
| 68-10 | 795.250 | 68-30 | 797.750 | | |
| 68-11 | 795.375 | 68-31 | 797.875 | | |
| 68-12 | 795.500 | 68-32 | 798.000 | | |
| 68-13 | 795.625 | 68-33 | 798.125 | | |
| 68-14 | 795.700 | 68-34 | 798.250 | | |
| 68-15 | 795.875 | 68-35 | 798.375 | | |
| 68-16 | 796.000 | 68-36 | 798.500 | | |
| 68-17 | 796.125 | 68-37 | 798.625 | | |
| 68-18 | 796.250 | 68-38 | 798.750 | | |
| 68-19 | 796.375 | 68-39 | 798.875 | | |
| 68-20 | 796.500 | 68-40 | 799.000 | | |

FIG. 6

| | Data | Contents |
|---|---|---|
| (1) | Frequency Setting | Setting Command for Frequency Used |
| (2) | Frequency Status | Frequency Data being Used |
| (3) | Group/Channel Setting | Setting Command for Group/Channel Data Used |
| (4) | Group/Channel Status | Group/Channel Data being Used |
| (5) | Tone Squelch, Noise Squelch, Muting Setting | Setting Command for ON/OFF of Tone Squelch, of Noise Squelch, of Muting |
| (6) | RF Squelch Level Setting | Command for Setting Value at Which RF Squelch Level Applied |
| (7) | Battery Status | Battery Voltage Data |
| (8) | RF Level Status | RF Level Data |
| (9) | AF Level Status | AF Level Data |
| (10) | Message Setting | Command for Setting Character Information as Message |
| (11) | Available Frequency Search | Available Frequency Detection Command |
| (12) | Available Frequency Status | Available Frequency Data |

WIRELESS AUDIO TRANSMISSION SYSTEM, RECEIVER, VIDEO CAMERA AND AUDIO MIXER

CROSS REFERENCES TO RELATED APPLICATIONS

The present invention contains subject matter related to Japanese Patent Application JP 2005-217821 filed in the Japanese Patent Office on Jul. 27, 2005, the entire contents of which being incorporated herein by reference.

BACKGROUND OF THE INVENTION

1. Field of the Invention

The present invention relates to a system in which audio to be recorded is transmitted using a wireless microphone. Further, the present invention relates to a receiver, a video camera and an audio mixer that constitute the system.

2. Description of the Related Art

In recent years, recording audio that is transmitted using a wireless microphone has become popular when gathering news materials and the like. FIG. 1 is a diagram showing an example of an external appearance of a wireless microphone. A wireless microphone transmitter (hereinafter referred to as a transmitter) 51 basically has a microphone and a modulator-transmitter transmitting a radio wave that is modulated by a audio signal from the microphone. A wireless microphone transmitter receiver (hereinafter, referred to as a receiver) 52 basically has a receiver-demodulator demodulating the audio signal after receiving the radio wave transmitted from the transmitter 51, and the demodulated audio signal is output to the outside of the receiver 52.

FIGS. 2A and 2B are diagrams each showing an example of audio transmission system using those transmitter 51 and receiver 52 for audio recording. In the example of FIG. 2A, the transmitter 51 is used by an interviewer. The receiver 52 is attached (or connected using a cable) to a VTR-incorporated video camera 53. Then, an audio signal input from the receiver 52 to the video camera 53 is recorded in the video camera 53 together with video that is captured by the video camera 53.

In the example of FIG. 2B, the transmitter 51 is used by an interviewer but the receiver 52 is connected to a stationary audio mixer 54 using a cable 55. Then, an audio signal input from the receiver 52 into the audio mixer 54 is mixed or switched in the audio mixer 54, and the audio signal output from the audio mixer 54 is recorded in a VTR, audio recorder which are not illustrated, or VTR-incorporated video camera such as the video camera 53 shown in FIG. 2A.

Hereupon, in the case where a wireless microphone including such transmitter 51 and receiver 52 is used, it is necessary to set a frequency of a radio wave used by the wireless microphone correspondingly to the circumstances of the site.

Specifically, a wireless microphone is typically made such that a frequency of a radio wave to be used can be set by selecting the frequency from a predetermined frequency band. However, there occurs interference when the same frequency being used by another device such as a wireless microphone used by others gathered around the site and a transmission system of a television broadcasting station located in the same area is selected as a frequency to be used at the site. Accordingly, it is necessary to select and set an available frequency that is not being used at the site when arrived at the site. Further, after starting, for example, news coverage, the frequency being used may need to be set again in response to fluctuation in the status of the radio wave due to a shift in the location and due to interference newly occurred by others gathered, and the like.

In the past, a frequency used by a wireless microphone is set at the site by operating an operation button for switching frequency that is provided in the transmitter 51 and receiver 52 to search an available frequency through a trial and error process.

In addition, only the followings are known in the past as the system including a wireless microphone and a video camera shown in FIG. 2A. There is a system in which only an audio signal (and a signal showing an RF level thereof) is output from a wireless microphone to a video camera, or a system in which an audio signal is output from a wireless microphone to a video camera and a control signal for controlling power on/off of the wireless microphone is output from the video camera to the wireless microphone (for example, refer to Patent Reference 1).

[Patent Reference 1] Japanese Published Patent Application No. 05-183788 (paragraphs 0021 through 0023, FIG. 1)

SUMMARY OF THE INVENTION

It takes time until an available frequency is found out when setting the frequency through a trial and error process as practiced in the past. Due to this, there is a possibility that a reporting opportunity might be missed particularly when mobility is required, for example, at the time of news coverage.

Here, there is considered a method of quickly setting the frequency, in which a wireless microphone (for example, the receiver 52 in FIG. 1) has the function of automatically detecting available frequencies and the function of displaying information on the detected available frequencies. Hence, the available frequencies are confirmed by viewing this information displayed on the wireless microphone so that the available frequency can be set as the frequency to be used.

However, when the receiver 52 is attached or connected to the video camera 53 as shown in FIG. 2A, there is recognized such a disadvantage that operability may be reduced if a camera operator views the display of the receiver 52 while recording video with a video camera particularly after starting the news coverage.

Further, when the receiver 52 is connected to the audio mixer 54 as shown in FIG. 2B, there is also recognized such a disadvantage that operability may be reduced if an operator views the display of the receiver 52 while operating the audio mixer 54 after starting the news coverage.

Moreover, although FIGS. 2A and 2B show the examples of externally attaching or connecting the receiver 52 to the video camera 53 and the stationary audio mixer 54, it is also conceivable in the future that the receiver is incorporated in a compact video camera and in a portable audio mixer. In such case, it is practically difficult to view the display of the receiver.

The inventor of the present invention has recognized the above-described problems. It is desirable to confirm available frequencies under excellent operability in audio transmission systems shown in FIGS. 2A and 2B in which an audio signal is input from a wireless microphone into a video camera and audio mixer for audio recording so that a frequency to be used by the wireless microphone can be set.

According to an embodiment of the present invention, there is provided a wireless audio transmission system that includes a transmitter, a receiver and a video camera. The transmitter has a microphone and a modulator-transmitter transmitting a radio wave modulated by an audio signal from the microphone. The receiver has a receiver-demodulator demodulating the audio signal after receiving the radio wave transmitted from the transmitter and outputs the audio signal demodulated by the receiver-demodulator to the outside of the receiver. The audio signal output from the receiver is input to the video camera. Further in this wireless audio transmission system, the receiver has a detector detecting frequencies of a radio wave not being used by other devices based on a reception level of the radio wave received by the receiver-demodulator and outputs available frequency information indicating the frequencies detected by the detector to the video camera. In addition, the video camera has a controller causing the available frequency information input from the receiver to be displayed on a display unit attached to the video camera.

Further, according to an embodiment of the present invention, there is provided a wireless audio transmission system that includes a transmitter, a receiver and an audio mixer. The transmitter has a microphone and a modulator-transmitter transmitting a radio wave modulated by an audio signal from the microphone. The receiver has a receiver-demodulator demodulating the audio signal after receiving the radio wave transmitted from the transmitter and outputs the audio signal demodulated by the receiver-demodulator to the outside of the receiver. The audio signal output from the receiver is input to the audio mixer. Further in this wireless audio transmission system, the receiver has a detector detecting frequencies of a radio wave not being used by other devices based on a reception level of the radio wave received by the receiver-demodulator and outputs available frequency information indicating the frequencies detected by the detector to the audio mixer. In addition, the audio mixer has a controller causing the available frequency information input from the receiver to be displayed on a display unit attached to the audio mixer.

Further, according to embodiments of the present invention, a receiver, video camera and audio mixer that constitute the above-described wireless audio transmission systems are provided.

As shown in FIGS. 2A and 2B, for example, according to an embodiment of the present invention, a receiver automatically detects available frequencies and causes available frequency information indicating the detected frequencies to be input into the video camera and audio mixer in an audio transmission system in which an audio signal is input from a wireless microphone into a video camera and audio mixer for audio recording.

Specifically, not only audio signals but also data that is the available frequency information is output from the wireless microphone to the video camera and audio mixer.

Further, the video camera and audio mixer causes the available frequency information input from the wireless microphone to be displayed on display units attached to the video camera and audio mixer.

Therefore, a camera operator can confirm the available frequencies by viewing the information displayed on that video camera, and an operator operating the audio mixer can confirm the available frequencies by viewing the information displayed on that audio mixer.

Accordingly, the camera operator and operator of the audio mixer can set the frequency to be used by the wireless microphone after the available frequencies are confirmed under excellent operability.

According to the embodiments of the present invention, such effectiveness is obtained that the available frequency is confirmed and the frequency to be used by the wireless microphone can be set under excellent operability in the audio transmission system in which the audio signal is input from the wireless microphone into the video camera and audio mixer for audio recording.

BRIEF DESCRIPTION OF THE DRAWINGS

FIG. 5 is a diagram showing an example of a frequency band that is used by the receiver and transmitter in FIG. 3;

FIG. 6 is a diagram showing kinds of serial data that are transmitted and received by the receiver in FIG. 3;

DESCRIPTION OF THE PREFERRED EMBODIMENTS

Hereinafter, embodiments of the present invention are specifically explained using the accompanied drawings. In the followings, two systems are explained, one of which is a system where an audio signal is input from a wireless microphone into a VTR-incorporated video camera, and the other of which is a system where an audio signal is input from a wireless microphone into an audio mixer.

[System with Audio Signal Input Into Video Camera]

Figure 1:
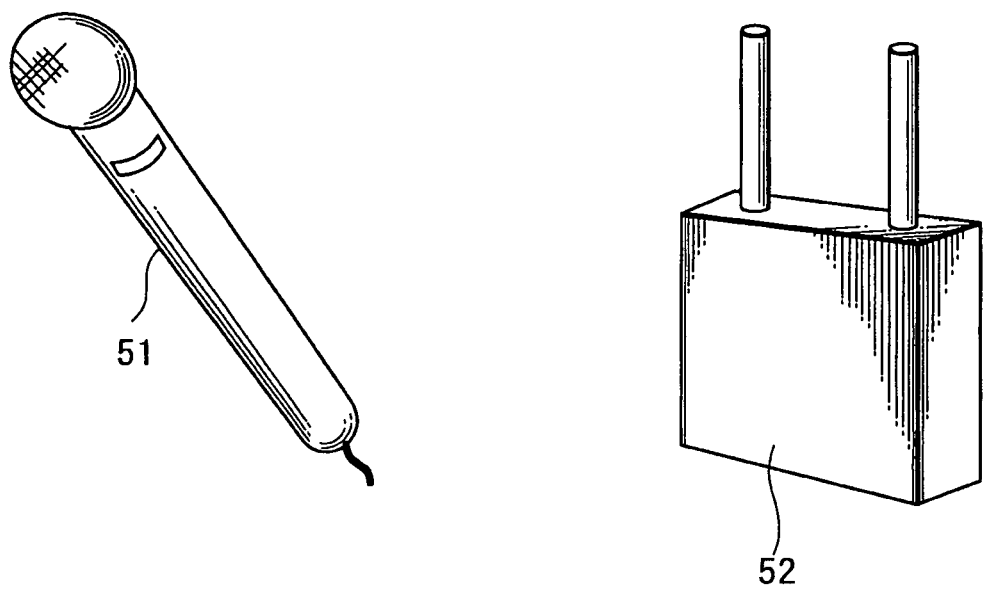
FIG. 1 is a diagram showing an example of an external appearance of a wireless microphone.
Figure 2A:
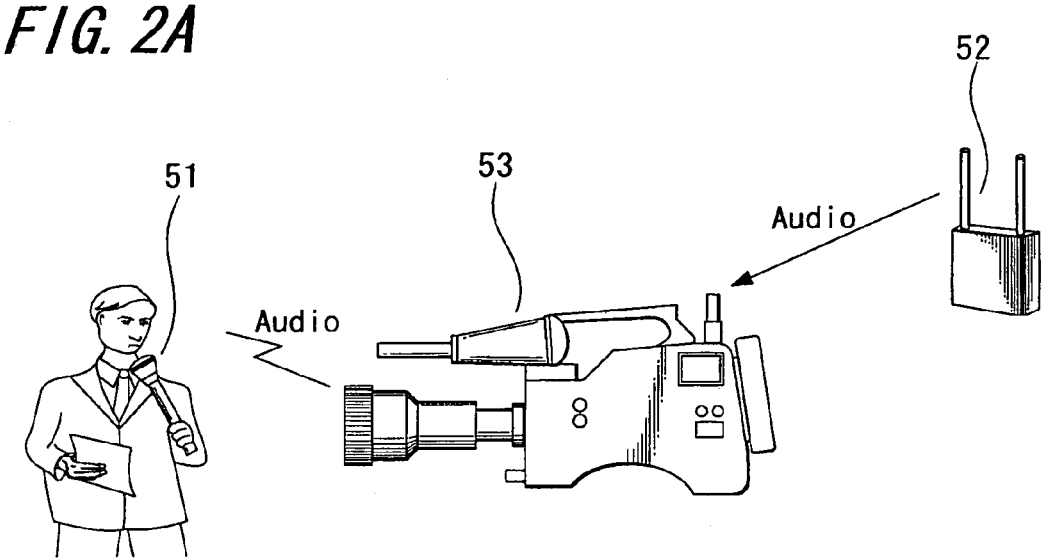
FIGS. 2A and 2B are diagrams showing examples of audio transmission systems using a wireless microphone transmitter.
Figure 3:
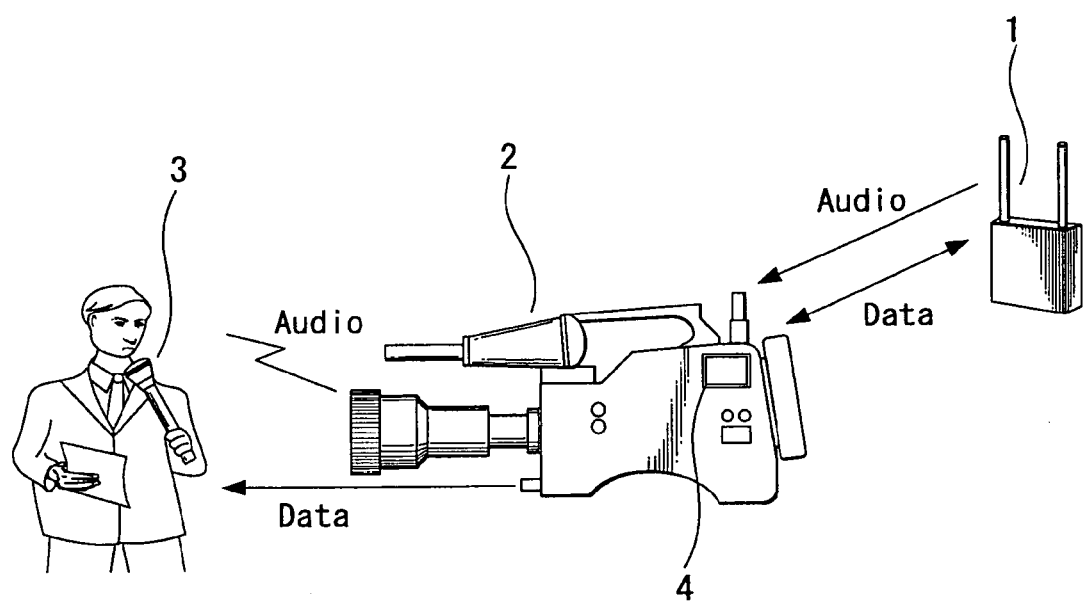
FIG. 3 is a diagram showing an embodiment of an audio transmission system to which the present invention is applied.

FIG. 3 shows an embodiment of an audio transmission system to which the present invention is applied. Similarly to the system shown in FIG. 2A, audio transmitted using a wireless microphone is input into a VTR-incorporated video camera at the site of news coverage or the like.

A wireless microphone transmitter receiver (hereinafter, referred to as a receiver) 1 is attached to a receiver insertion slot that is provided in the rear of a VTR-incorporated video camera 2. A wireless microphone transmitter (hereinafter, referred to as a transmitter) 3 is used by an interviewer. An audio signal transmitted from the transmitter 3 to the receiver 1 is input from the receiver 1 into the video camera 2 and is recorded into the video camera 2 together with video captured by the video camera 2.

Further, the receiver 1 in this system detects frequencies that are not being used at the site by other devices such as wireless microphones of other media gathered at the site and a transmission system of a television broadcasting station located in the same area. Then, data (available frequency information) indicating the detected frequencies is input from the receiver 1 into the video camera 2.

In the video camera 2, this available frequency information is displayed on a view finder 4 attached to the video camera 2. Also, data (frequency selection information) indicating the frequency selected among those available frequencies is sent from the video camera 2 to the transmitter 3 by infrared data communication.

Figure 4A:
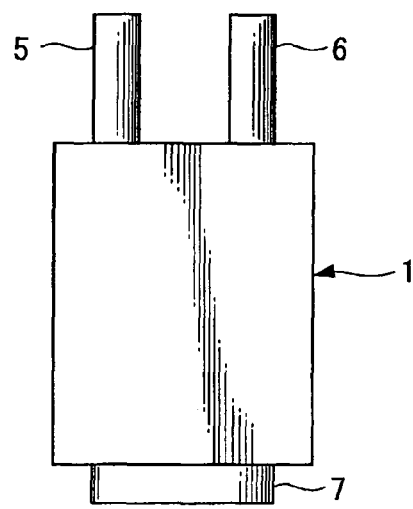
FIGS. 4A and 4B are diagrams showing a configuration of a receiver in FIG. 3.
Figure 4B:
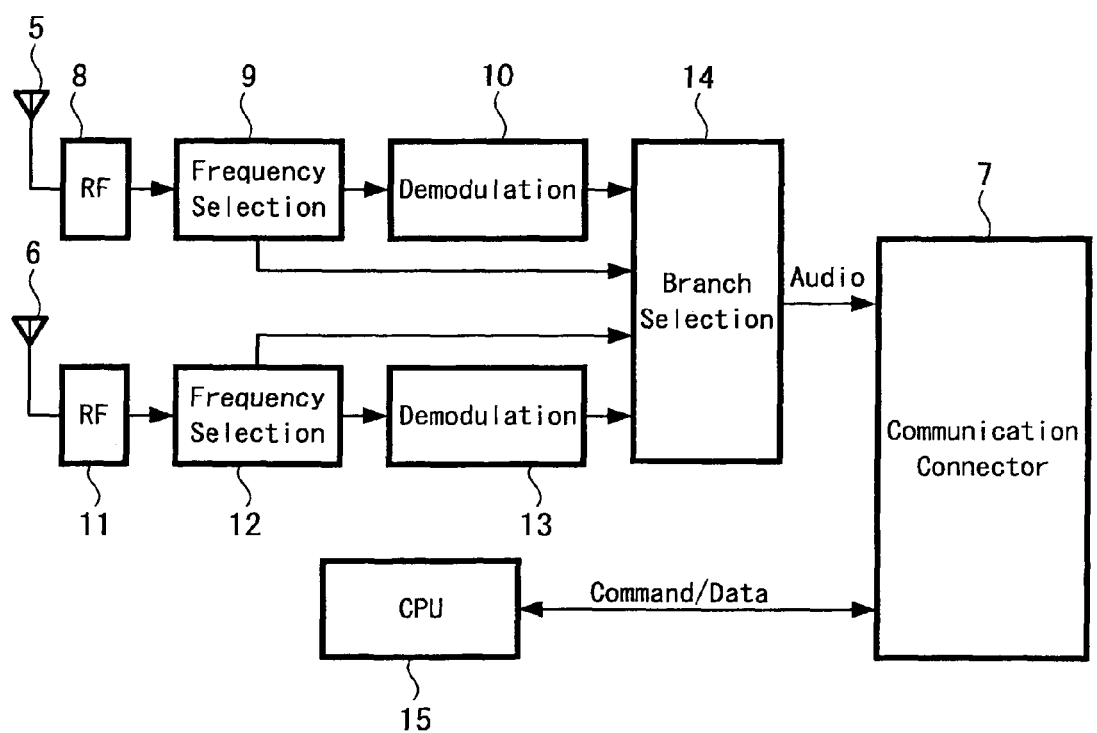

Next, a configuration for the input/output and display of data is explained. FIGS. 4A and 4B show a configuration of the receiver 1, in which FIG. 4A is a front view showing an external appearance and FIG. 4B is a block diagram showing a circuit configuration thereof.

As shown in FIG. 4A, the receiver 1 has two receiving antennas (branches) 5 and 6 for diversity reception on the upper side of a body and has a communication connector 7 on the lower side of the body. Although not illustrated, the communication connector 7 has an audio signal output pin and a data communication pin for performing data communication based on RS232C standard that is one of serial communication formats.

FIG. 4B shows a simplified circuit configuration of the receiver 1, because a general configuration of a receiver of a diversity reception method is widely known. In the receiver 1, an audio signal is demodulated in a demodulation circuit 10 through an RF amplifier 8 and a frequency selection circuit (band pass filter having variable passing band, or the like) 9 from a radio wave received by the receiving antenna 5 in FIG. 4A. Further, an audio signal is demodulated in a demodulation circuit 13 through an RF amplifier 11 and a frequency selection circuit 12 from a radio wave received by the receiving antenna 6 in FIG. 4A.

Then, either the audio signal from the demodulation circuits 10 or the audio signal from the demodulation circuit 13 is selected in a branch selection circuit 14 based on outputs from the frequency selection circuits 9 and 12, and the like. The audio signal selected in the branch selection circuit 14 is output from the above-described audio signal output pin of the communication connector 7 to the outside (to the video camera 3 in FIG. 3).

A CPU 15 controls each portion in the receiver 1 and performs data communication with the outside (with the video camera 3 in FIG. 3) through the above-described data communication pin of the communication connector 7.

In the receiver 1 and the transmitter 3 of FIG. 3, a frequency of a radio wave to be used is selected from a predetermined frequency band (group) (selected in the frequency selection circuits 9 and 12 in the receiver 1) to be set.

FIG. 5 shows an example of this frequency band. In this example, a frequency to be used can be selected among forty-seven frequencies from 68-01 (794.125 MHz) to 68-47 (799.875 MHz) in TV 68ch which is one of television broadcasting frequency bands in the United States. It should be noted that this frequency band (group) is not fixed but is set by data sent to the CPU 15 through the communication connector 7 in the receiver 1.

FIG. 6 shows a specific example of serial data transmitted and received by the receiver 1 through the communication connector 7. "Frequency Setting" is a command (received by the receiver 1) for setting a frequency to be used between the receiver 1 and transmitter 3. "Frequency Status" is data (transmitted by the receiver 1) indicating the frequency that is set based on the "Frequency Setting" command.

"Group/Channel Setting" is a command (received by the receiver 1) for setting a frequency band (group) as shown in FIG. 5. "Group/Channel Status" is data (received by the receiver 1) indicating the frequency band (group) that is set based on the "Group/Channel Setting" command.

"TONE Squelch, NOISE Squelch, MUTING Setting" is a command (received by the receiver 1) for setting ON/OFF of the tone squelch function, noise squelch function and muting. The tone squelch function is to prevent noise by being muted in states other than the state where a tone exists (state where RF is generated at a certain determined frequency). The noise squelch function is to perform muting when a noise level of the audio signal exceeds a reference value.

"RF Squelch Level Setting" is a command (received by the receiver 1) for setting a value at which an RF squelch level is applied. The RF squelch function is to perform muting when the received RF signal becomes less than a predetermined level.

"Battery Status" is data (transmitted by the receiver 1) indicating a voltage of a battery incorporated in the transmitter 3 in FIG. 3.

"RF Level Status" is data (transmitted by the receiver 1) indicating a level of the RF signal being received by the receiver 1.

"AF Level Status" is data (transmitted by the receiver 1) indicating an AF level that is an audio level of the audio signal extracted from the RF signal being received by the receiver 1.

"Message Setting" is a command (received by the receiver 1) for setting character information (for example, user name) as a message.

"Available Frequency Search" is a command (received by the receiver 1) for detecting an available frequency not being used by other devices from the frequency band that is set based on the above-described "Group/Channel Setting" command. "Available Frequency Status" is data (transmitted by the receiver 1) indicating the available frequency that is detected based on the "Available Frequency Search" command.

Although not illustrated in FIG. 6, the following commands are also transmitted and received (received by the receiver 1) through the communication connector 7. Those are commands requesting data on the "Frequency Status", "Group/channel Status", a status of set result based on "TONE Squelch, NOISE Squelch, MUTING Setting" command, a status of set result based on the "RF Squelch Level Setting" command, "Battery Status", "RF Level Status", "AF Level Status", a status of set result based on the "Message Setting" command.

Figure 7:
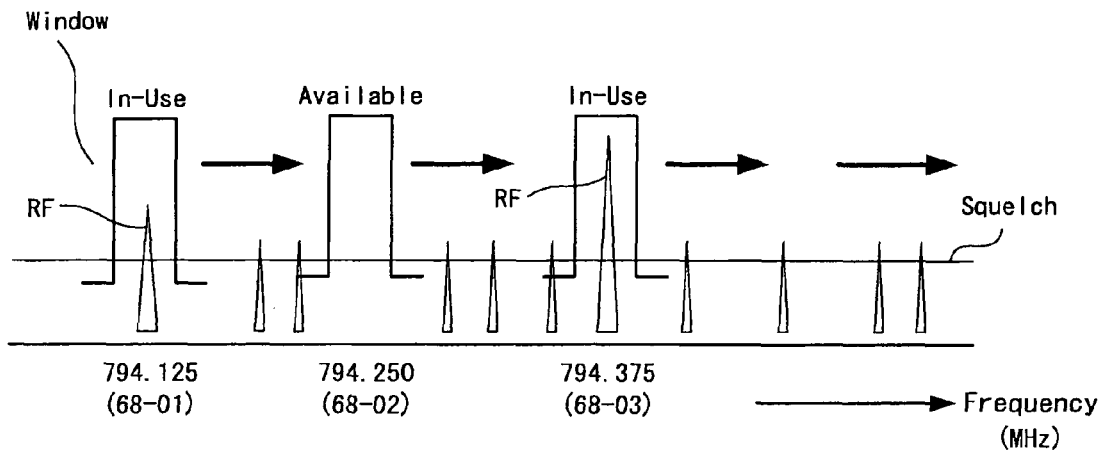
FIG. 7 is a diagram showing an example of a method of detecting available frequencies that is executed by the receiver in FIG. 3.

FIG. 7 shows a method of detecting an available frequency that is executed by the CPU 15 in the receiver 1 based on the "Available Frequency Search" command when the frequency band shown in FIG. 5 is used as an example. First, a window is set at a frequency range in the vicinity of 794.125 MHz that is the frequency of 68-01 channel in FIG. 5 (in terms of the configuration of FIG. 4B, a frequency range in the vicinity of 794.125 MHz is selected by the frequency selection circuits 9 and 12), and an RF level of the radio wave of this frequency range is measured. Further, it is judged that 794.125 MHz is currently used when the RF level is equal to or more than the RF squelch level (that is set based on the above-described "RF squelch level setting" command).

Subsequently, this window is moved to a frequency range in the vicinity of 794.250 MHz that is the frequency of 68-02 channel in FIG. 5 (a frequency range in the vicinity of 794.250 MHz is selected by the frequency selection circuits 9 and 12 in FIG. 4), and an RF level of the radio wave of this frequency range is measured. When the RF level is less than the RF squelch level this time, it is judged that 794.250 MHz is an available frequency.

Further, similar processing is repeated using this window and a frequency range in the vicinity of each of 68-03 through 68-47 channels in FIG. 5 is sequentially scanned.

Figure 8:
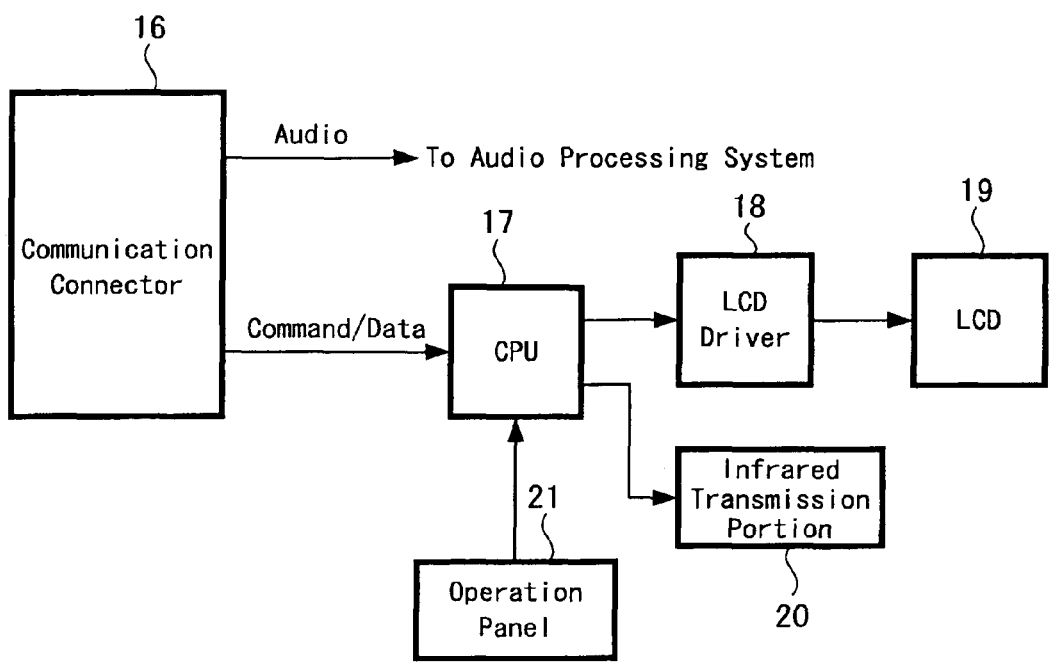
FIG. 8 is a block diagram showing portions among the configuration of the video camera in FIG. 3, which are related to an embodiment of the present invention.

With respect to the video camera 2 in FIG. 3 the configuration of an imaging system, video processing system, audio processing system and recording/reproducing system (VTR portion) is similar to that of a typical VTR-incorporated video camera. FIG. 8 is a block diagram showing the configuration of the video camera 2 regarding portions related to an embodiment of the present invention.

In the video camera 2 is provided a communication connector 16 having an audio signal input pin and data communication pin (for performing data communication based on RS232C standard) correspondingly to the communication connector 7 (FIG. 4) of the receiver 1.

An audio signal input from the communication connector 16 is recorded in a VTR portion (not shown) through an audio processing system (not shown).

A CPU 17 is a processor controlling each portion in the video camera 2, and with respect to processing relating to the embodiment of the present invention the CPU 17 performs data communication with the outside (with the receiver 1 in FIG. 3) through the above-described data communication pin of the communication connector 16 based on operation of an operation panel 21. Further, based on a result of that communication the CPU 17 controls an LCD driver 18 (that is a circuit driving an LCD 19 constituting the view finder 4 in FIG. 3) and an infrared transmission unit 20.

In the operation panel 21, although not shown, the following operation buttons are provided in addition to operation buttons having the same functions as a typical VTR-incorporated video camera.

(1) An operation button to request available frequency information (hereinafter, referred to as "Available Frequency Button")

(2) An operation button to select a frequency among the displayed available frequencies (hereinafter, referred to as "Frequency Selection Button")

(3) An operation button to request status information indicating a receiving state of a radio wave (hereinafter, referred to as "Status Button")

Next, in the state where the receiver 1 is attached to the video camera 2 as shown in FIG. 3, processing of the video camera 2 and receiver 1 based on operation of each of those "Available Frequency Button", "Frequency Selection Button" and "Status Button" is explained.

When "Available Frequency Button" is operated, the CPU 17 in the video camera 2 transmits the "Available Frequency Search" command (FIG. 6) to the receiver 1 through the communication connector 16.

The CPU 15 (in FIG. 4B) in the receiver 1 detects available frequencies by the above-described method of FIG. 7 based on this "Available Frequency Search" command, and sends back "Available Frequency Status" (FIG. 6) to the video camera 2 through the communication connector 7.

The CPU 17 in the video camera 2 controls the LCD driver 18 based on this "Available Frequency Status" to display frequency information available at present on the view finder 4 (FIG. 3). When a video being captured by the imaging system of the video camera 2 is displayed on the view finder 4, the display on the view finder is switched.

Figure 9A:
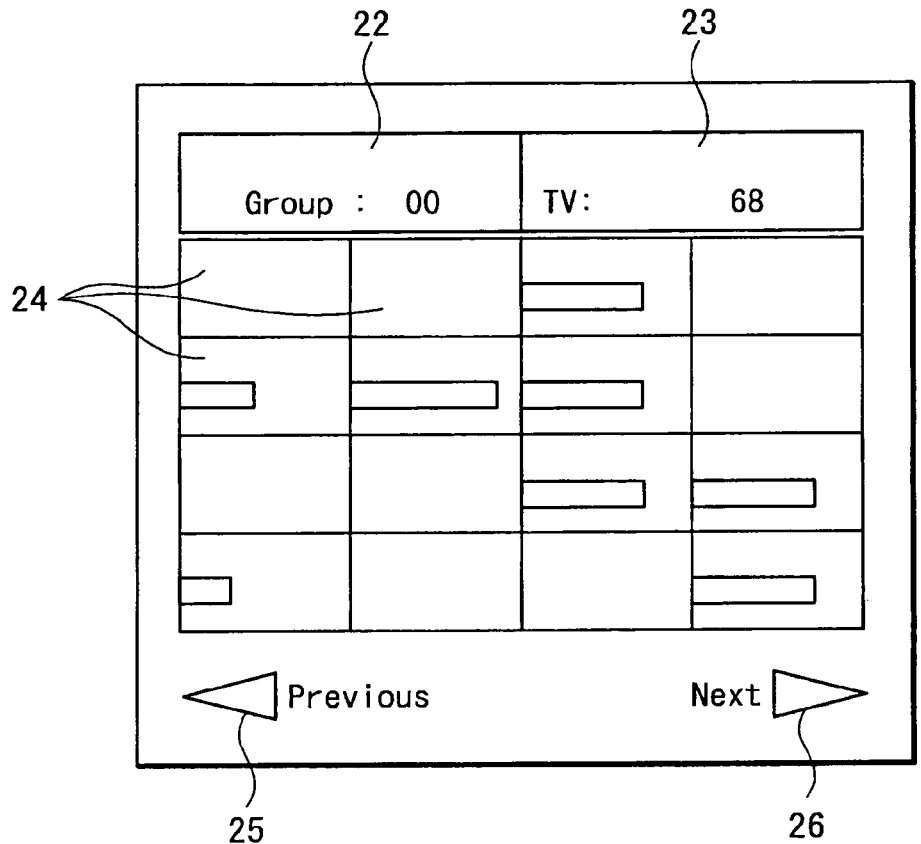
FIGS. 9A and 9B are diagrams showing a display example of available frequency information on a view finder of the video camera in FIG. 3.
Figure 9B:
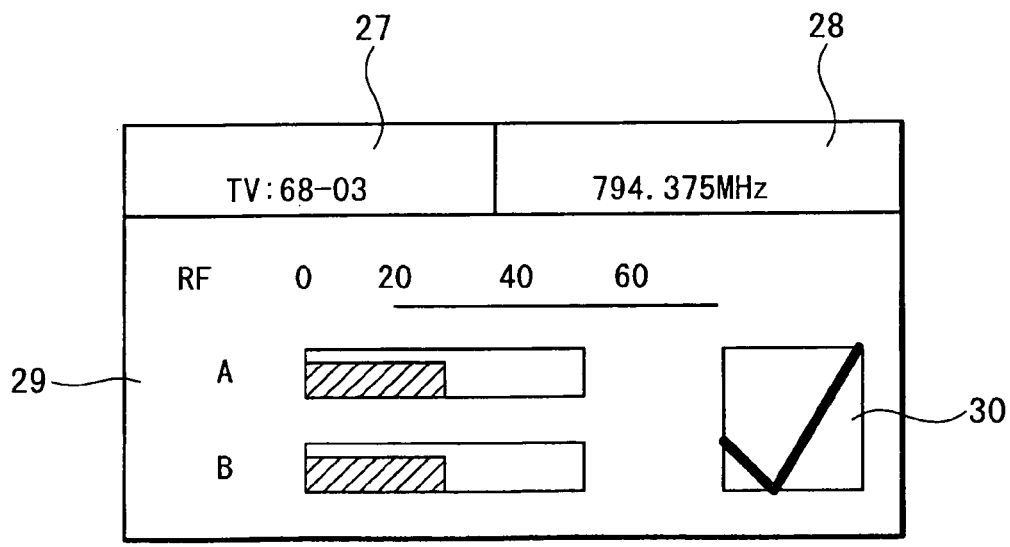

FIGS. 9A and 9B are diagrams showing an example of a display screen of this available frequency information. First, a screen as shown in FIG. 9A is displayed. The following boxes and buttons are provided on this screen.

(1) Boxes 22 and 23 displaying respectively the group number (here, 00) and television channel number (here, TV 68 ch in FIG. 5) of the frequency band (group) that is set in advance based on the "Group/Channel Setting" command (FIG. 6)

(2) Boxes 24 displaying an RF level of individual frequency channels (here, 68-01 through 68-47 channels in FIG. 5) in the frequency band (group) displayed in the boxes 22 and 23 by predetermined number (16 in this figure) of channels at a time (3) Buttons 25 and 26 for switching the number of frequency channels displayed in the boxes 24 forward and backward respectively When an operation of specifying a frequency channel in the boxes 24 is performed using the operation panel 21 in the state where the screen of FIG. 9A is displayed, a screen shown in FIG. 9B is displayed with respect to the specified frequency channel. The following boxes and buttons are provided on this screen.

(1) Boxes 27 and 28 displaying respectively the number (here, 68-03 in FIG. 5) and frequency (here, 794.375 MHz) of the specified frequency channel (2) A box 29 displaying an RF level (outlined bar chart) and an RF squelch level (shaded bar chart) with respect to the frequency channel displayed in the boxes 27 and 28 (bar charts A indicate the radio wave reception levels regarding the receiving antenna 5 in FIG. 4A and bar charts B indicate the radio wave reception levels regarding the receiving antenna 6 in FIG. 4A)

(3) A box 30 displaying a check mark when the frequency channel displayed in the boxes 27 and 28 is being used at present When any available frequency (frequency channel without the check mark being displayed in the box 30 in FIG. 9B) is selected by the above-described "Frequency Selection Button" in the operation panel 21 in the state where either the screen of FIG. 9A or the screen of FIG. 9B is displayed, the CPU 17 in the video camera 2 transmits the "Frequency Setting" command (FIG. 6) to the receiver 1 through the communication connector 16, causing the selected available frequency to be used.

The CPU 15 in the receiver 1 sets a reception frequency (frequency selected by the frequency selection circuits 9 and 12 in FIG. 4B) based on this "Frequency Setting" command. Further, the CPU 15 sends "Frequency Status" (FIG. 6) back to the video camera 2 through the communication connector 7.

Furthermore, the CPU 17 in the video camera 2 transmits the "Frequency Setting" command (FIG. 6) to the transmitter 3 in FIG. 3 through the infrared transmission unit 20 (FIG. 8), causing the selected available frequency to be used.

Similarly to a typical wireless microphone transmitter, the transmitter 3 has a microphone and a modulator-transmitter transmitting a radio wave modulated by an audio signal from the microphone (as well as transmitting a radio wave modulated by a signal outside the audio range showing that voltage of the battery in the transmitter is lowered). In addition, although not shown in the figure, the transmitter 3 has an infrared reception unit and a CPU setting a transmission frequency based on a command received by this infrared reception unit. Further, the transmitter 3 sets a transmission frequency based on the "Frequency Setting" command from the video camera 2.

Accordingly, an audio signal is transmitted to the receiver 1 from the transmitter 3 using the frequency that is selected by "Frequency Selection Button" in the operation panel 21 of the video camera 2. Further, the audio signal is input from the receiver 1 to the video camera 2 to be recorded in the video camera 2.

When the above-described "Status Button" in the operation panel 21 is operated in the state where the audio signal is thus being transmitted from the transmitter 3 to the receiver 1, the CPU 17 in the video camera 2 transmits to the receiver 1 through the communication connector 16 such commands requesting the following status information. Specifically, the commands request data on "Frequency Status", "Group/channel Status", "Battery Status", "RF Level Status" and "AF Level Status" in FIG. 6 and data on the statuses of set results based on "TONE Squelch, NOISE Squelch, MUTING Setting" command, "RF Squelch Level Setting" command and "Message Setting" command in FIG. 6.

The CPU 15 in the receiver 1 sends back the data on each status requested by those commands to the video camera 2 through the communication connector 7.

The CPU 17 in the video camera 2 causes the present reception status to be displayed on the view finder 4 (FIG. 3) by controlling the LCD driver 18 based on the data on those statuses. When the video being captured by the imaging system of the video camera 2 is displayed on the view finder 4, the display is switched.

Figure 10:
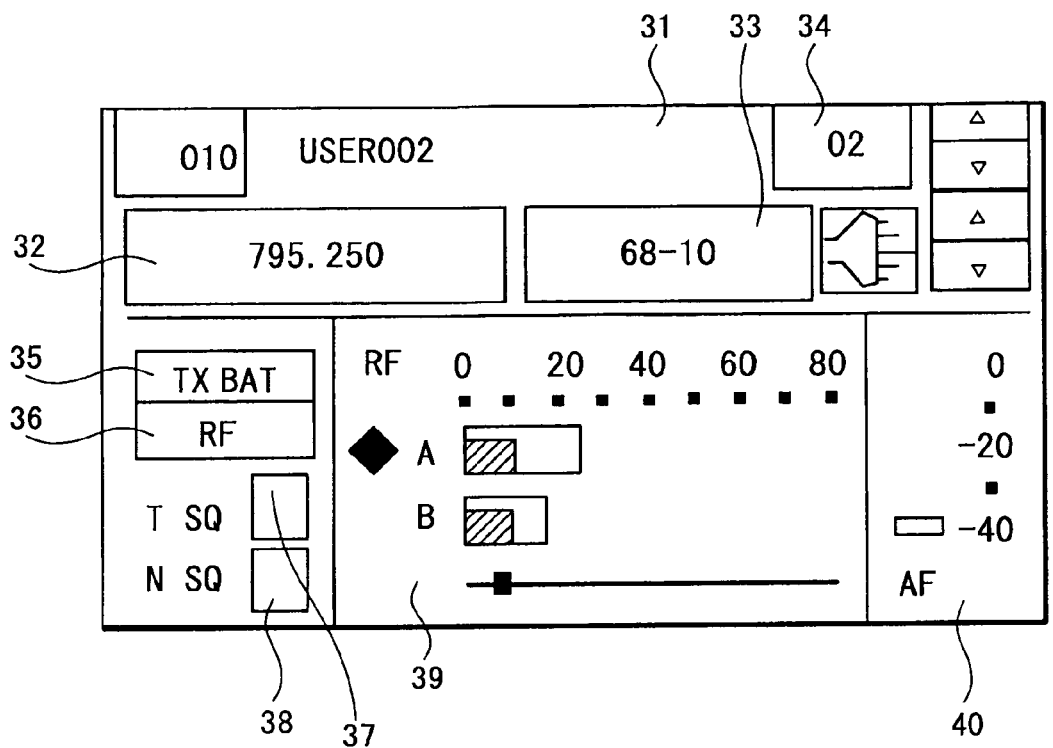
FIG. 10 is a diagram showing a display example of a reception status on the view finder of the video camera in FIG. 3.

FIG. 10 is a diagram showing an example of a display screen of this reception status. The following boxes are provided on this screen.

(1) A box 31 displaying a user name and an identification name (2) Boxes 32 and 33 displaying respectively the frequency and channel number being used (3) A box 34 displaying the group number of the frequency band (group) being set (4) A box 35 alarming with light that the battery in the transmitter 3 will be consumed in a certain period of time (5) A box 36 alarming by changing a color of light that the RF level becomes higher than the RF squelch level (6) A box 37 displaying ON/OFF state of the tone squelch function (7) A box 38 displaying ON/OFF state of the noise squelch function (8) A box 39 displaying the RF level (outline bar chart) and the RF squelch level (shaded bar chart) with respect to the frequency being used (bar charts A indicate the levels with respect to the receiving antenna 5 in FIG. 4A and bar charts B indicate the levels with respect to the receiving antenna 6 in FIG. 4A)

(9) A box 40 displaying the AF level with respect to the frequency being used

Next, explanation is made with respect to operation of a camera operator operating the video camera 2 and setting a frequency of a radio wave to be used by the receiver 1 and transmitter 3 in the system shown in FIG. 3.

When arriving at a site for news coverage, the camera operator first operates "Available Frequency Button" in the operation panel 21 of the video camera 2 in order to select an available frequency that is not being used at the site by other devices such as wireless microphones of reporting staff of other media gathered at the site and transmission systems of television broadcasting stations located in the same area.

With this, the "Available Frequency Search" command is sent from the video camera 2 to the receiver 1, and "Available Frequency Status" indicating available frequencies detected by the method of FIG. 7 is sent back from the receiver 1 to the video camera 2 and so the available frequency information is displayed on the view finder 4 of the video camera 2 as shown in FIGS. 9A and 9B.

The camera operator confirms the presently available frequencies by viewing the display of this available frequency information on the view finder 4 and selects any one of the available frequencies by "Frequency Selection Button" in the operation panel 21 of the video camera 2.

Then, the "Frequency Setting" command causing the selected available frequency to be used is sent from the video camera 2 to the receiver 1 and transmitter 3 so that the frequency to be used by the receiver 1 and transmitter 3 is set to the available frequency.

Accordingly, news coverage can be started to record audio without causing any interference with the other devices.

After that, the camera operator operates "Status Button" in the operation panel 21 of the video camera 2 during the news coverage in accordance with a necessity (when the location is moved and when other reporting crews newly joined in the neighborhood, for example).

Then, a command requesting data on the status is sent from the video camera 2 to the receiver 1, and the requested status data is sent back from the receiver 1 to the video camera 2 and so the reception status is displayed on the view finder 4 of the video camera 2 as shown in FIG. 10.

Even the available frequency selected when starting the news coverage, there is such a possibility that the reception level deteriorates and the interference occurs, because the status of the radio waves changes with a movement of the location thereafter and as new reporting crew joins. The camera operator can confirm the present reception status by viewing the display of this reception status on the view finder 4 (particularly, boxes 36 through 39 in FIG. 10).

When the reception status deteriorated, the frequency used by the receiver 1 and transmitter 3 can be changed into another frequency of excellent reception status by operating "Available Frequency Button" and "Frequency Selection Button" of the video camera 2 in a similar manner to the operation when arriving at the site.

Thus, according to this system the camera operator operating the video camera 2 can confirm available frequencies by displaying available frequency information on the view finder 4 of the video camera 2 itself by operating the operation panel 21 of the video camera 2. Then, the frequency to be used by the receiver 1 and transmitter 3 can be set by the operation of the operation panel 21 of the video camera 2.

Therefore, available frequencies are confirmed under excellent operability and so the frequency to be used by the receiver 1 and transmitter 3 can be set without taking time.

Furthermore, according to this system even after setting the frequency to be used by the receiver 1 and transmitter 3, the reception status can be displayed on the view finder 4 of the video camera 2 itself by the operation of the operation panel 21 of the video camera 2 and so the camera operator operating the video camera 2 can confirm the present reception status.

Therefore, even after starting news coverage, the present reception status can be confirmed under excellent operability and the frequency to be used by the receiver 1 and transmitter 3 can be set again without taking time when the reception status deteriorated.

Accordingly, audio can be record without missing a reporting opportunity even in the site of news coverage where the mobility may be required.

[System with Audio Signal Input Into Audio Mixer]

Figure 2B:
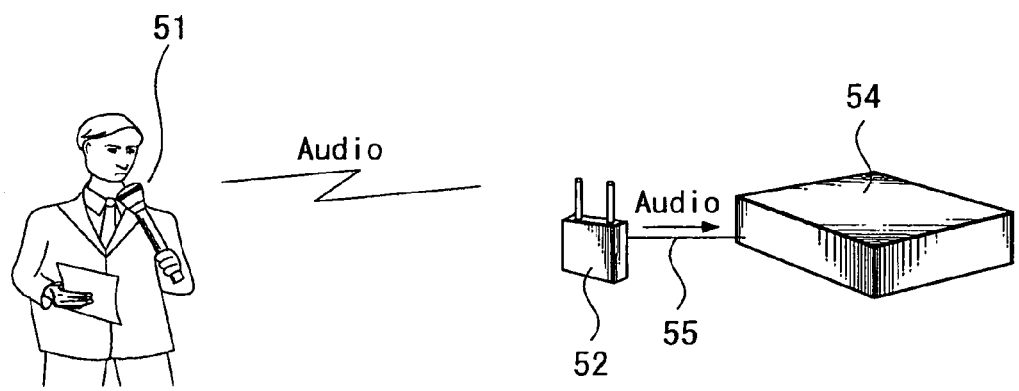
Figure 11:
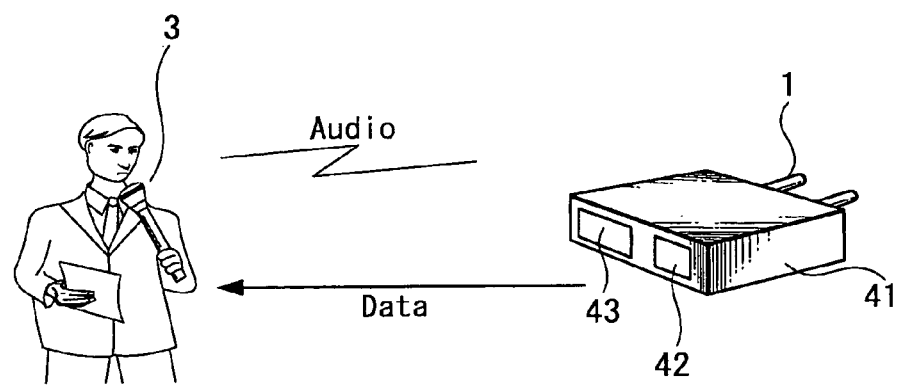
FIG. 11 is a diagram showing another embodiment of an audio transmission system to which the present invention is applied.

FIG. 11 shows another embodiment of an audio transmission system to which the present invention is applied, in which the same reference numerals are given to portions common to those in FIG. 3. In this system, audio transmitted using a wireless microphone is input into an audio mixer at the site of news coverage or the like, similarly to the system shown in FIG. 2B.

The transmitter 3 is used by an interviewer and the receiver 1 is incorporated in a portable audio mixer 41 (fixed in the audio mixer 41 with an antenna portion being exposed to the outside). On the front surface of the audio mixer 41 are provided an LCD display portion 42 and an operation panel 43. The interviewer or another staff may use the audio mixer 41 by slinging it from his/her own shoulder using a shoulder strap. An audio signal transmitted from the transmitter 3 to the receiver 1 is input into the audio mixer 41 from the receiver 1, and the audio signal output from the audio mixer 41 is recorded in a VTR that is not illustrated or in a VTR-incorporated video camera such as the video camera 2 shown in FIG. 3.

Configurations and processing of the receiver 1 and transmitter 3 are the same as those explained in the system of FIG. 3.

Figure 12:
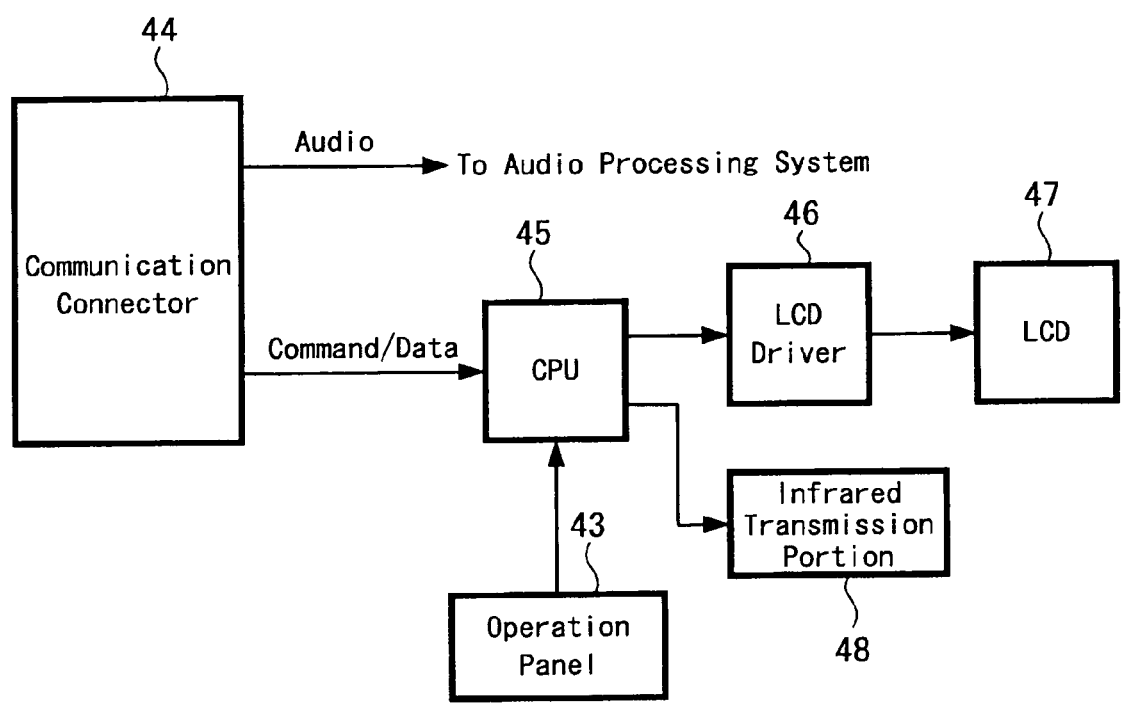
FIG. 12 is a block diagram showing portions among a configuration of an audio mixer in FIG. 11, which are related to an embodiment of the present invention.

The audio mixer 41 has a similar configuration to a typical audio mixer with respect to portions regarding an audio processing system (an equalizer and fader to adjust sound volume and circuits to perform audio mixing and switching). FIG. 12 is a block diagram showing portions with respect to the configuration of the audio mixer 41 particularly relating to the embodiment of the present invention.

The audio mixer 41 includes a communication connector 44 having an audio signal input pin and a data communication pin to perform data communication based on RS232C standard correspondingly to the communication connector 7 of the receiver 1 (FIGS. 4A and 4B).

An audio signal input from the communication connector 44 is output from the audio mixer 41 through the audio processing system (not illustrated).

A CPU 45 is a processor controlling each portion in the audio mixer 41 and further performs, as processing related to the embodiment of the present invention, data communication with the outside (receiver 1 in FIG. 11) through the above-described data communication pin of the communication connector 44 based on the operation of the operation panel 43 (FIG. 11). Further, the CPU 45 controls an LCD driver 46 that is a circuit driving an LCD 47 constituting the LCD display portion 42 in FIG. 11 and an infrared transmission unit 48 based on a result of that communication. This processing by the CPU 45 is the same as the processing executed by the CPU 17 (FIG. 8) in the video camera 2 in the system shown in FIG. 3.

In the operation panel 43 are provided "Available Frequency Button", "Frequency Selection Button" and "Status Button" having the same functions as those provided in the operation panel 21 of the video camera 2 in the system of FIG. 3, in addition to operation buttons having the same functions as those in a typical audio mixer although not shown in the figure.

According to the system of FIG. 11, the available frequency information is displayed on the LCD display portion 42 of the audio mixer 41 itself by operation of the operation panel 43 of the audio mixer 41 similarly to the system of FIG. 3 and so an interviewer or another staff operating the audio mixer 41 can confirm available frequencies. Then, the frequency to be used by the receiver 1 and transmitter 3 can be set by the operation of the operation panel 43 of the audio mixer 41.

Therefore, available frequencies are confirmed under excellent operability and so the frequency to be used by the receiver 1 and transmitter 3 can be set without taking time.

Further, even after the frequency used in the receiver 1 and transmitter 3 is set, the reception status is displayed on the LCD display portion 42 of the audio mixer 41 by the operation of the operation panel 43 of the audio mixer 41 similarly to the system of FIG. 3 and so the present reception status can be confirmed.

Therefore, after starting news coverage, the present reception status can be confirmed under excellent operability and the frequency to be used by the receiver 1 and transmitter 3 can be set again without taking time when the reception status deteriorated.

Accordingly, it becomes possible to record audio without missing a reporting opportunity even in the site such as news coverage where mobility may be required.

Note that, the receiver 1 in the system shown in FIG. 3 is attached to the video camera 2 having the receiver insertion slot. However, not limited thereto, the receiver 1 may be connected using a cable to a small video camera in which a receiver insertion slot may not be provided, or the receiver 1 may be incorporated in a video camera.

In addition, the receiver 1 is incorporated in the audio mixer 41 in the system shown in FIG. 11, however, the receiver 1 may be attached to an audio mixer which has a receiver insertion slot.

Furthermore, the receiver 1 is attached to the VTR-incorporated video camera in the system shown in FIG. 3. However, not limited thereto. The receiver 1 may be attached to a video camera in which other recording apparatuses than a VTR (for example, optical disc apparatus) are incorporated, or the receiver 1 may be attached to a video camera in which a recording apparatus is not incorporated (an audio signal input from the receiver 1 into the video camera is output from the video camera to a VTR and the like).

Further, in the system shown in FIG. 11, audio transmitted using the wireless microphone is input into the audio mixer 41 at the site of news coverage and the like. However, as another embodiment of the present invention, audio transmitted using the wireless microphone such as voice of singer and sound of musical instrument may be input into the audio mixer 41 in a concert hall, at the site of live performance and the like. In such cases also, the performance can be smoothly carried out, because a present reception status is confirmed under excellent operability during the performance and so the transmitter 3 can be replaced with another transmitter 3 before consuming the battery, for example.

Furthermore, the "Frequency Setting" command is transmitted from the video camera 2 and the audio mixer 41 to the transmitter 3 by the infrared data communication in the systems shown in FIG. 3 and FIG. 11. However, the "Frequency Setting" command may be transmitted from the video camera 2 and the audio mixer 41 to the transmitter 3 by other wireless communication methods than the method using infrared rays, or the "Frequency Setting" command may be transmitted from the video camera 2 and the audio mixer 41 to the transmitter 3 by wired communication.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless audio transmission system comprising:
a transmitter having a microphone and a modulator-transmitter transmitting a radio wave modulated by an audio signal from the microphone;
a receiver having a receiver-demodulator demodulating the audio signal after receiving the radio wave transmitted from said transmitter, outputting the audio signal demodulated by said receiver-demodulator and transmitting the audio signal to the outside of the receiver;
wherein said receiver includes a detector detecting frequencies of a radio wave not being used by other devices based on a reception level of the radio wave received by said receiver-demodulator and outputs available frequency information indicating the frequencies detected by said detector and transmits said available frequency information; and a video camera, remote from the receiver, to receive and record video data, the video camera having an attached view finder, and to (1) receive and record the transmitted audio signal from the receiver, (2) receive and display the available frequency information in the view finder attached to the camera, (3) determine selected frequency data, which is a particular frequency selected from among the available frequency information, and (4) transmit the selected frequency data from the video camera to the transmitter, wherein the transmitter receives from the video camera the selected frequency data among the available frequency information and the transmitter uses the selected frequency data for audio transmission, wherein the receiver receives from the video camera the selected frequency data among the available frequency information and the receiver uses the selected frequency to receive audio transmission from the transmitter, wherein the video camera transmits to the receiver and transmitter another selected frequency when reception on the selected frequency deteriorates, and wherein said detector detects frequencies of a radio wave not being used by other devices based on an available frequency search command received by the receiver, the detection includes (a) setting a frequency range to a predetermined frequency band in response to a group/channel setting command received by the receiver by referencing group/channel status data, (b) measuring a Radio Frequency (RF) level of the radio wave of the frequency range, (c) incrementing the frequency range, and (d) repeating steps (a) to (c) until determining that the frequency range is not being used when the RF level is less than a predetermined level.

2. A wireless audio transmission system according to claim 1, wherein said controller of said video camera outputs a command requesting said available frequency information to said receiver in response to a predetermined operation executed to request said available frequency information, and said receiver further includes a controller causing said detector to detect frequencies of a radio wave not being used by other devices based on said command input from said video camera and causing said available frequency information to be output to said video camera.

3. A wireless audio transmission system according to claim 1, wherein said controller of said video camera outputs selection result information indicating a selected frequency to said receiver in response to a predetermined operation executed to select the frequency among available frequencies displayed on said display unit, and said receiver further includes a controller setting a frequency of a radio wave to be received by said receiver-demodulator based on said selection result information input from said video camera.

4. A wireless audio transmission system according to claim 1, wherein said video camera further includes a transmission unit that transmits data to said transmitter, said controller of said video camera outputs frequency selection information indicating a selected frequency to said transmitter from said transmission unit in response to a predetermined operation executed to select the frequency among available frequencies displayed on said display unit, and said transmitter further includes a controller setting a frequency of a radio wave to be transmitted from said modulator-transmitter in accordance with said frequency selection information transmitted from said transmission unit of said video camera.

5. A wireless audio transmission system according to claim 1, wherein said receiver includes a generator generating status information indicating a reception status of the radio wave being received by said receiver-demodulator and outputs said status information generated by said generator to said video camera, and said controller of said video camera causes said status information to be displayed on said display unit.

6. A video camera into which an audio signal is input from the outside, comprising:

a controller to cause available frequency information to be displayed on a display unit attached to the video camera based on the input of the available frequency information indicating frequencies of a radio wave not being used by other devices from the outside of the video camera, and wherein the video camera receives and records video data, the video camera having an attached view finder, and to (1) receive and record the transmitted audio signal from the receiver, (2) receive and display the available frequency information in the view finder attached to the camera, which is a particular frequency selected from among the available frequency information, and (3) transmits the selected frequency data from the video camera to the transmitter, and wherein determining the selected frequency includes (a) detecting frequencies of a radio wave not being used by other devices based on an available frequency search command received by the receiver, and setting a frequency range to a predetermined frequency band in response to a group/channel setting command received by the receiver by referencing group/channel status data, (b) measuring a Radio Frequency (RF) level of the radio wave of the frequency range, (c) incrementing the frequency range, and (d) repeating steps (a) to (c) until the measured RF level is less than a predetermined level, wherein the transmitter is controlled from the video camera to use the selected frequency data among the available frequency information for audio transmission, wherein the receiver is controlled from the video camera to use the selected frequency data among the available frequency information and the receiver uses the selected frequency to receive audio transmission from the transmitter, wherein the video camera transmits to the receiver and transmitter another selected frequency when reception on the selected frequency deteriorates.

7. A video camera according to claim 6, wherein said controller outputs a command requesting said available frequency information to the outside of the video camera in response to a predetermined operation executed to request said available frequency information.

8. A video camera according to claim 6, wherein said controller outputs selection result information indicating a selected frequency to the outside of the video camera in response to a predetermined operation executed to select the frequency among the available frequencies displayed on said display unit.

9. A video camera according to claim 6, wherein said controller causing status information to be displayed on the display unit based on the input of the status information indicating a reception status of the radio wave from the outside of the video camera.

* * * * *